United States Patent [19]
Craig

[11] Patent Number: 4,740,836
[45] Date of Patent: Apr. 26, 1988

[54] COMPATIBLE 3D VIDEO DISPLAY USING COMMERCIAL TELEVISION BROADCAST STANDARDS AND EQUIPMENT

[76] Inventor: Dwin R. Craig, 9447 Emory Grove Rd., Gaithersburg, Md. 20877

[21] Appl. No.: 878,224

[22] Filed: Jun. 25, 1986

Related U.S. Application Data

[63] Continuation-in-part of Ser. No. 558,302, Dec. 5, 1983, abandoned.

[51] Int. Cl.[4] .............................................. H04N 13/00
[52] U.S. Cl. ...................................... 358/92; 350/132; 351/175; 358/88
[58] Field of Search ................ 358/3, 88, 92, 91; 350/132, 139, 286; 351/175; 364/522

[56] References Cited

U.S. PATENT DOCUMENTS

| | | | |
|---|---|---|---|
| 548,495 | 10/1895 | Abbe | 350/286 |
| 1,520,311 | 12/1924 | Ruth | 350/286 |
| 2,396,902 | 3/1946 | Tuttle | 351/175 |
| 2,674,156 | 4/1954 | Mahler | 350/131 |
| 2,828,670 | 1/1958 | Luboshez | 350/286 |
| 2,889,739 | 6/1959 | Moore | 350/131 |
| 2,891,444 | 6/1959 | Ewald | 350/131 |
| 3,784,738 | 1/1974 | Natter | 358/88 |
| 3,851,955 | 12/1974 | Kent | 350/132 |
| 3,884,548 | 5/1975 | Linder | 350/286 |
| 4,295,153 | 10/1981 | Gibson | 358/88 |
| 4,429,328 | 1/1984 | Jones | 358/88 |
| 4,523,226 | 6/1985 | Lipton | 358/92 |
| 4,559,556 | 12/1985 | Wilkins | 358/88 |
| 4,562,463 | 12/1985 | Lipton | 358/88 |
| 4,568,970 | 2/1986 | Rockstead | 358/88 |
| 4,571,628 | 2/1986 | Thornton | 358/88 |
| 4,582,393 | 4/1986 | Shieman | 350/132 |
| 4,588,259 | 5/1986 | Sheiman | 350/132 |
| 4,625,290 | 11/1986 | White | 364/522 |

FOREIGN PATENT DOCUMENTS 2150311 6/1985 United Kingdom ................ 350/132

Primary Examiner—Howard W. Britton

[57] ABSTRACT

A video display operating at standard commercial television broadcast sweep rates, line spacing and/or pixel density. An over and under split screen presentation of a stereoscopic pair of images permits three dimensional viewing by audiences of any size using simple optical deviation elements mounted in a pair of spectacles. Besides being compatible with broadcast standards, the display is compatible with the format already used in producing 3D motion picture films permitting unaltered broadcast of such films and/or direct transfer to video tape with existing equipment. The recorded video can then be viewed by said optical deviation elements. The final display, when viewed stereoscopically, exhibits an aspect ratio of more than twice the width to height which is about the same as motion picture screens and well suited for display of sporting events regularly broadcast on television. The said display is compatible with normal viewing without the steroscopic impression, by the unaided eyes and seen in full color with normal clarity and definition.

8 Claims, 4 Drawing Sheets

COMPATIBLE 3D VIDEO DISPLAY USING COMMERCIAL TELEVISION BROADCAST STANDARDS AND EQUIPMENT

This is a continuation-in-part of U.S. patent application Ser. No. 558,302 filed Dec. 5, 1983, now abanonded.

BACKGROUND OF THE INVENTION

The present invention relates to video display and viewing apparatus and methods, and more particularly to an apparatus for and a method of displaying a stereoscopic pair of images and viewing them in three dimensions.

There have been many attempts to provide three-dimensional video display and viewing apparatus. Most noteworthy of these attempts have been in the television field. In general, it is known that three-dimensional viewing can be provided by simultaneous or alternate display of a stereo pair of images on a video display means such as the raster of a television receiver. A "stereo" pair of images are images of the same object or scene taken from different angles much as the different viewing angles of objects or scenes seen by a person as a result of the spacing between the eyes. The stereo images are displayed on a video display and means is provided whereby the viewer sees only one image of the stereo pair with one eye and the other image with the other eye, consequently seeing the scene in three dimensions.

One technique which has been attempted is to display a stereo pair of images on a video display side-by-side, separated by a vertical line. This technique was believed to be desirable for the reason that such image positioning corresponds to the positioning of a viewer's eyes. In this technique, the viewer employs some device so that he sees only one image with one eye and only the other image with the other eye.

Another known technique is to produce a stereographic display of comingled or superimposed images in different colors on a video display and to provide the viewer with separate colored filters so that he sees one image with one eye and the other image with the other eye.

Still another technique is to display the stereo images alternately or sequentially at high speed and to provide means for the viewer such as high speed shutters so that the viewer sees only one image with the left eye and the other with the right eye.

These prior techniques have not been successful for various reasons. Side-by-side image arragement on a video display constrict the horizontal dimension of the images and reduces the stereoscopic effect. Also, standard video display devices such as television receivers do not include a control or adjustment for horizontal sweep so that the image widths cannot be adjusted. To provide for such adjustment would require extensive future modification of such video display devices and prevents satisfactory use of currently existing video display devices.

The techniques using comingled display of images of different color and alternate or sequential image display makes special viewing devices mandatory if the display is to be intelligible so that the display cannot be viewed without such devices. Also, the cost of the instrumentation required to reproduce and view comingled or sequential image display makes these techniques commercially unacceptable.

Specific background inventions are disclosed in three recently issued U.S. patents and are discussed in the following: U.S. Pat. No. 4,523,226 issued on June 11, 1985 to L. Lipton et al and U.S. Pat. No. 4,562,463 issued on Dec. 31, 1985 both describe a stereoscopic television system involving sequential display of the left eye view and the right eye view. The first shows a stereoscopic pair of images disposed one above the other, but with vertical foreshortening of the subject (anamorphic distortion). To overcome this defect, the sweep rate is then increased to twice that of accepted broadcast standards which immediately destroys compatibility with existing practice or equipment used for transmission or reception in the home. Both patents incorporate electronic storage of sequential television fields and require electronically activated polarizers to alternately blank the left and right eye views in synchronism with the television display. As a result, that system is very expensive, limited in application and is also incompatible for viewing without the synchronized polarizing shutters.

U.S. Pat. No. 4,582,393 was issued on Apr. 15, 1986 to David M. Shieman and claims the use of Fresnel prisms and polarizers for viewing "a pair of right and left stereoscopic images of a subject positioned in a side-by-side array." No claim for over and under positions of the images is made, although depicted in one of the drawings, and no preference is stated as to which should be the left eye view. Shieman fails to teach that the upper image should be the left eye view in order to be compatible with 3-D motion picture formats and also to achieve enhanced stereo through motion parallax when using a television camera for live transmission and/or recording for subsequent viewing. Moreover, he uses a prism in front of each eye which introduces combined color shifts, loss of resolution and unnecessary complications in adjusting the deviation angles to accommodate different viewing distances from the display. He proposes interchangeable prisms to provide said adjustment which is far more expensive and cumbersome than the use of a continuously variable optical element.

SUMMARY OF THE INVENTION

The present invention overcomes the problems and difficulties of the prior art and provides a video display which may be viewed comfortably in either two-dimensional or three-dimensional fashion. The video display of this invention utilizes a split screen display divided by a horizontal line to produce upper and lower images of a stereoscopic pair. The display of this invention is adapted for direct viewing using optical path deviation means which allows a viewer to see one of the images with one eye and the other of the images with the other eye, i.e., binocularly. The aspect ratio, of the display images, i.e., the ratio of width to height, is optimized permitting nearby objects on either side of the center of the images to enhance depth perception. Also the over and under displayed images viewed through optical wedge means in accordance with the invention eliminates the need to adjust for differences in eye spacing of different viewers as is required when viewing images displayed side-by-side.

When utilizing the present invention in connection with standard video display devices such as television receivers, it will be understood that those receivers conventionally include height adjustment means which can be used to eliminate overscanning. Those receivers also include a vertical linearity control which can adjust the heights of the images to be substantially equal.

Furthermore, apparent resolution of the stereoscopic image is doubled. For example, if an object in the upper image is painted with 100 horizontal lines on the video raster and the same object in the lower image is painted with 100 horizontal lines, the perceived stereoscopic image appears to be painted with 200 horizontal lines. Hence, the resolution perceived by the viewer's two eyes appears to have twice the resolution seen by either eye alone.

The over/under split screen display is compatible with motion picture screen geometry and is also the same format used on motion picture film for projection 3-D movies where the upper image is the left eye view as in the present invention. This permits live transmission, as well as direct conversion to video tape, for viewing on a standard television set or TV projection screen.

Importantly, the apparatus of the invention requires no change or alteration of the standard commercial broadcast video signal for three-dimensional viewing. Conventional transmission and recording techniques can be employed and only a single channel is required, operating on any domestic or foreign standard, now or in the future.

Still further, the video display technique of this invention allows either of the images to be viewed separately in standard two-dimension fashion if a viewer so desires. Both images are available in full color, motion, sound, and normal resolution.

Additional objects and advantages of the invention will be set forth in part in the description or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the three-dimensional video display and viewing apparatus comprises video display means producing upper and lower images of a stereoscopic pair divided by a horizontal line, optical path deviation means operable to allow a viewer to see one of the images with one eye and the other of the images with the other eye.

The optical deviation means can include two substantially identical optical wedges (refracting prisms) with the same deviation angle oppositely arranged so that when the viewer looks straight at the display, one eye sees the upper image and the other eye sees the lower image. Preferably, the wedge means includes a single optical path deviator with twice the deviation angle so that one eye of the viewer looks directly at one of the display images while the other eye sees the other image through a path deviated by the optical wedge. Optical deviation can also be accomplished by a pair of mirrors forming a periscope for one eye.

Broadly, the invention is directed to a method of displaying and viewing a stereoscopic pair of images in three-dimensions comprising the steps of displaying the images one above the other on a video display means separated by a horizontal line, and providing continuously variable deviation means operable to allow a viewer to see one of the images with one eye and the other of the images with the other eye over a wide range of display sizes and viewing distances.

The accompanying drawings which are incorporated in and constitute a part of this specification, illustrate one embodiment of the invention and, together with the description, serve to explain the principles of the invention.

DESCRIPTION OF THE PREFERRED EMBODIMENT

Reference will now be made in detail to the present preferred embodiment of the invention, an example of which is illustrated in the accompanying drawings.

In accordance with the invention, video display means is provided which produces upper and lower images of a stereoscopic pair divided by a horizontal line. As embodied herein and shown in FIG. 1, a video display means 11 has upper and lower images 13, 15 of a scene thereon which are divided by a horizontal line 17. Images 13, 15 are a stereo pair, i.e., views of the same scene as seen from two different angles similar to that which occurs when a person looks at a scene through his two eyes. The video display means 11 may include a cathode ray tube (CRT) 19 and can be part of a standard television receiver or other video display such as that used in computer graphic video games as will be understood by those skilled in the art.

Figure 1:
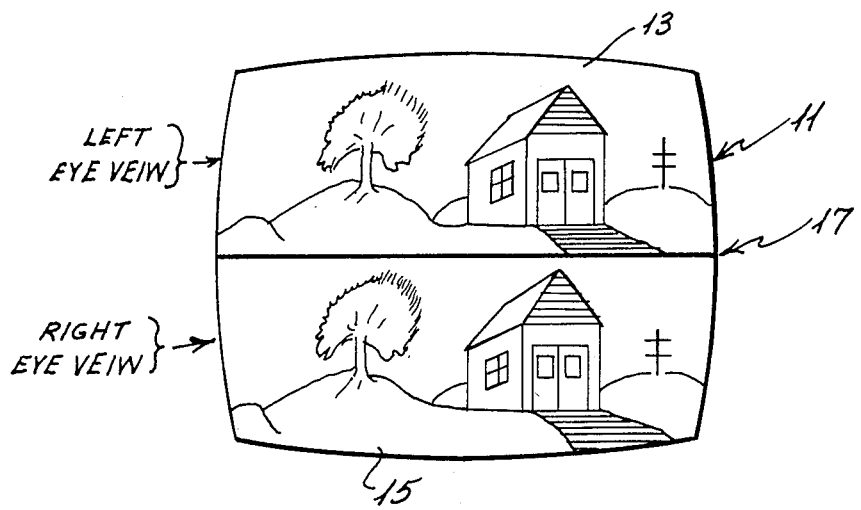
FIG. 1 is a schematic representation of a video display arrangement of a stereoscropic pair of images in accordance with the invention.
Figure 2:
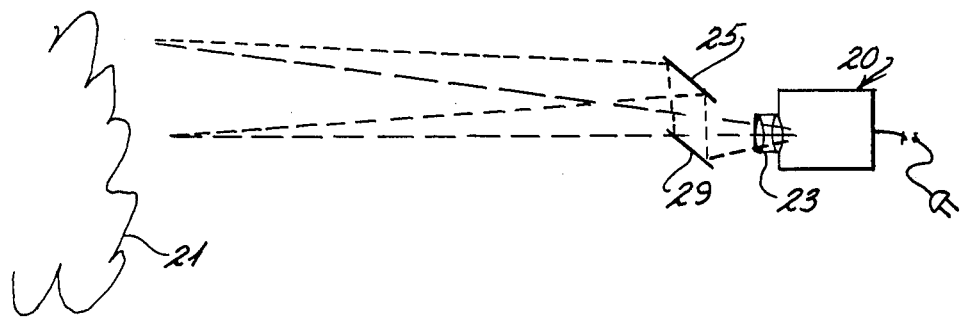
FIG. 2 is a side schematic view showing a device capable of producing the stereoscopic image display of FIG. 1.
Figure 3:
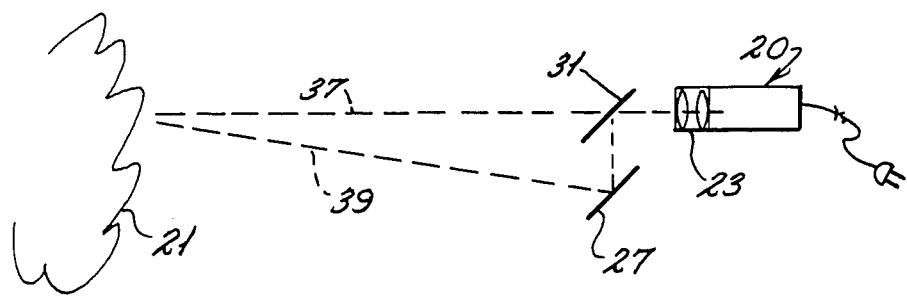
FIG. 3 is a top view of FIG. 2.

FIGS. 2 and 3 illustrate schematically one type of apparatus which may be used to produce the stereoscopic pair of images shown in FIG. 1. As seen in FIGS. 2 and 3, a standard television camera 20 views a scene 21 through a lens 23. Light from the scene 21 reaches the camera lens 23 through an optics arrangement which includes two pairs of mirrors. Mirrors 25 and 29 form a vertical periscope while mirrors 27 and 31 form a horizontal periscope.

As can be seen from the converging lines 37, 39 in FIG. 2, light from the scene 21 is reflected by mirrors 25 and 29, and is viewed by the lower portion of the lens 23. Light from the scene 21 is similarly reflected by mirrors 27 and 31 and is viewed by the upper portion of the lens 23. Since the light is reflected by mirrors 31 and 27 which view the scene 21 from different horizontal positions, i.e., different angles as seen by lines 37, 39, the views of the scene 21 seen by the camera 20 through the lens 23 are a stereoscopic pair.

Desirably, the outboard mirror 25, can be provided with an angular adjustment which is operatively connected to the zoom control of the camera lens 23 to accommodate various focal lengths. Also, the outboard mirror 27 can be angularly adjustable to vary the convergence angle for different subject distances. Normal eye base or spacing between human eyes is about 3". However, it may be desirable to provide separation between mirrors 27 and 31 up to 3' or more for stereoscopic imaging of distant scenes.

The above described apparatus is suitable for use with television, motion picture or still cameras.

The apparatus illustrated in FIG. 2 and 3 requires but four mirrors (no refractive elements) to produce the split screen stereoscopic input to the camera. Consequently, it can be used with any camera (as an attachment) and involves only reflection so that no chromatic aberrations are introduced at any wavelength of light from ultraviolet to far infra red.

The manner in which the image viewed by the camera is converted and transmitted to the video display device will be understood by those skilled in the art and is not described further here. Further more, in addition to producing the display by way of a television camera directly, the stereo images can be produced on the display a video tape cassette or disc, or by computer generated graphics as will be understood by those skilled in the art. Further, the camera and computer images can be intermixed sequentially, superimposed, or combined in a mosaic.

Figure 4:
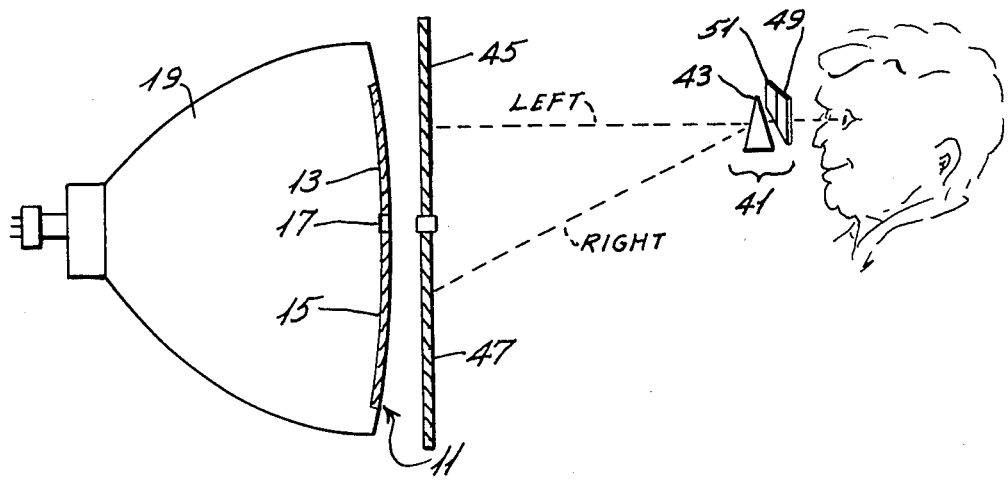
FIG. 4 is a side schematic view illustrating two fixed deviation viewing devices for viewing the stereoscopic image pair of FIG. 1.

In accordance with the invention, optical means is provided which is operable to allow a viewer to see one of the images of the stereo pair with one eye and the other of the images with the other eye. As embodied herein, optical means with fixed deviation angle are generally illustrated in FIG. 4. An optical wedge means 41 includes a single optical wedge 43 through which the viewer can look with one eye. The wedge 43 has a fixed deviation or light refraction angle such that when a viewer is looking straight at one of the images 13, on the video display means 11 from a predetermined distance, the eye which does not look through the wedge sees that image while the other eye looking through the wedge 43 sees the other image 15. This allows each eye to see the correct image for the intended eye. The horizontal line 17 defines a separation zone between the images 13, 15 which eliminates confusion at the boundary.

Alternatively, a pair of wedges one for each eye and having half the deviation angle of the single wedge 43 could be provided. A single wedge is preferred for the reason that it is less expensive and importantly, because one of the viewer's eyes has a clear view of one of the stereo images which helps to eliminate possible loss of resolution. If one of the viewer's eyes sees a sharp image and the other an unsharp image, the viewer's brain records only the sharp image.

When the over and under image display is viewed at a distance, each eye can see both images. Use of the optical wedge means 41 as described above allows each eye when looking straight ahead to see only the correct image for the intended eye. When the images are fused in the brain, the observer sees three images, stacked one above the other. The upper and lower images are extraneous and the center image is the one desired and is seen by the viewer in three-dimensions. Therefore, it is desirable to eliminate the extraneous images.

In accordance with the invention, a first pair of sheet polarizers polarized at 90° relative to one another are positioned in front of the video display means, one over each of the stereo images. As embodied herein, an upper sheet polarizer 45 is positioned in front of the upper portion of the video display 11 and over the upper image 13. A lower sheet polarizer 47 is positioned in front of the lower portion of the video display 11 and over the lower image 15. The sheet polarizers 45, 47 are polarized at 90° relative to one another.

Further in accordance with the invention, a second pair of sheet polarizers polarized at 90° relative to one another and corresponding to respective ones of the first pair of polarizers are operatively associated with the optical wedge means to eliminate extraneous images of the video display seen by the viewer, whereby the viewer sees one image stereoscopically. As embodied herein, a sheet polarizer 49 corresponding to the sheet polarizer 45 and a sheet polarizer 51 corresponding to the sheet polarizer 47 are provided adjacent the optical wedge means 41. The optical wedge means "and the sheet polarizers 49, 51 can be conveniently mounted on a frame 53 which can be worn by a viewer in a manner similar to eye glasses. The sheet polarizers 49, 51 are positioned so that each one is over a respective one of the viewer's eyes. Since the sheet polarizer 49 corresponds to the sheet polarizer 45 and the polarizer 51 to the polarizer 47, the extraneous images are extinguished so that only the middle image is seen stereoscopically.

Spectacles for viewing 3-D movies use a pair of polarizers oriented at 90° to each other and 45° to horizontal. For the present invention, there is some advantage to using a vertical and horizontal arrangement of the polarizers 45 and 47. Sheet polarizers are usually polarized parallel to the length of the rolls produced by a continuous manufacturing process. Consequently, the yield is significantly greater when rectangles are cut with and across the "grain" rather than at 45° to it. A further advantage of this arrangement is that ordinary polarized sunglasses can be used as the starting point for viewing spectacles—offering a wide range of ready made sizes, colors, and frame stypes. Sunglasses are polarized parallel to horizontal and are already suitable for viewing one of the images without obstruction. It is then possible to provide a simple clip-on device for the other eye, comprised of an optical deviator and a ½ wave retardation plate situated in front of one of the sunglass lenses. The retardation plate rotates the plane of polarization by 90° so that the light passing through the vertically polarized sheet in front of the video display can be seen by the eye confronted by the clip-on device. The optical deviation means can be either a fixed or variable wedge or a periscope.

Superposition in the brain of the upper and lower images of the display is accomplished solely by the optical deviator and does not produce a double image when the head is tilted, such as occurs in a movie where both images are polarized and superimposed at the projection screen. Here the stereo image can be viewed without any polarizers, which may be interjected only to extinguish the two unwanted images above and below the stereo image. Rather than extinguished, the unwanted images can be suppressed by adding a surround to the video display comprised of a pattern which offers a confused background against which the images are seen. The pattern may consist of random, multi-colored geometric shapes. The pattern can be illuminated from the front or may be illuminated from the rear by light from the video display. With rear illumination, the brightness of the pattern will rise and fall in proportion to brightness of the unwanted images being suppressed.

The optical deviation means 41 can be constructed so that the left eye of the viewer sees either the upper or lower image 13, 15 and the right eye the other image. Because of the manner or sequence of photographing scenes and the manner in which the video display is painted, it may be desirable to select which eye of the viewer sees the upper and which eye the lower image.

In the case of a cathode ray tube, the picture is produced by a flying spot of light which sweeps across the CRT raster from top to bottom so that the picture is painted in timed sequence from top to bottom. Thus, the upper image 13 appears on the video display before the lower image. Also, normal television photography taken from a moving vehicle in the United States is from the passenger side. Therefore, the upper image 13 on the video display 11 should be that which the eye of the viewer would first see. For example, if the photography is taken from a moving vehicle looking out the right side of the vehicle, the viewer's left eye would first see whatever is behind an obstacle such as a billboard, building, etc., before the same is seen by the right eye. The effect is generally termed "motion parallax" where the point of view changes as the result of motion of the observer. In this case, it can be concluded that the upper image should be presented to the left eye and the lower image should be presented to the right eye. This arrangement allows the effect of motion parallax to enhance the otherwise stereoscopic effect.

The situation is reversed if the photography is taken out the left side of the vehicle in which case the right eye is the first to see behind obstacles so that the right eye should see the upper image 13 and the left eye the lower image 15. This would be the case, for example, when photographing out the passenger side of an automobile traveling in Great Britain. This requires simply that the wedge means and polarizers be coordinated so that the viewer's eyes see the correct image.

All of the aforementioned optical deviation functions performed by a "wedge" of fixed angle can also be performed by a pair of mirrors mounted to form a vertical periscope.

Figure 5:
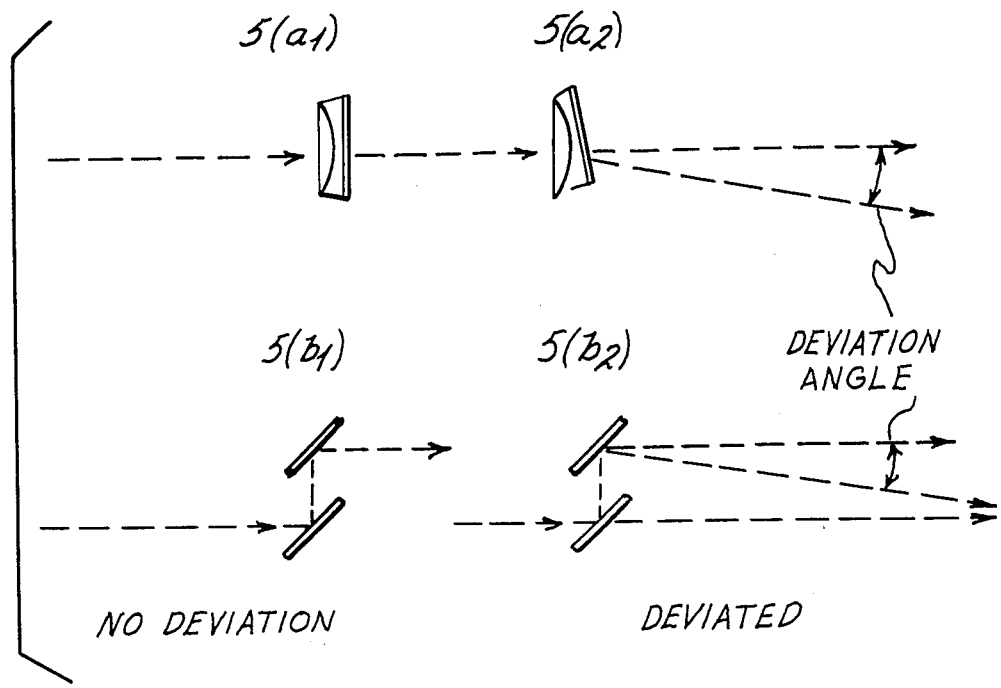
FIG. 5 is a side schematic view illustrating two variable deviation viewing devices.

Preferably, the optical means would be continuously variable over a range of deviation angles to accommodate different display sizes and viewing distances. A variable wedge and a variable periscope are shown in FIG. 5. FIG. 5 ($a_1$, and $a_2$) show a variable wedge (refractor) while 5 ($b_1$ and $b_2$) show a variable periscope (reflector). The wedge consists of two plano-curved elements. One element is plano-concave and the other is plano-convex. The curved surfaces (either spherical or cylindrical) are matched to have the same radius of curvature so that when the plane surfaces are parallel there is no deviation between entering and exiting rays. However, when the curved surfaces slide with respect to each other, as in a ball and socket, the plane surfaces are no longer parallel and the exiting rays are refracted to produce whatever deviation angle is needed to bring the two images into register. The same optical means could be used whether the two images were positioned one above the other or side by side. In general, the described optical deviation means (by refraction) could be used wherever variable deviation angles between entering and exiting rays are desireable. Cylindrical curved surfaces provide one degree of freedom whereas spherical curved surfaces permit two degrees of freedom for any combination of deviations about horizontal and vertical axes.

In an optimum design the two plano-curved elements would be made of materials having different optical dispersion properties to eliminate color aberrations. Also the curved surfaces would be coupled by a viscous fluid having substantially the same index of refraction in order to eliminate surface reflections and minor mismatches between the curved surfaces. Further, the fluid would act as a lubricant and a seal against dirt.

If one of the periscope mirrors of FIG. 5 ($b_1$ and $b_2$) is hinged, a single degree of freedom is available for producing continuously variable deviation angles with the added advantage that no color dispersion would occur at any wavelength of light.

From the foregoing, the advantages of the present invention will be obvious to those skilled in the art. By utilizing the over and under display arrangement of the stereo pair of images, the present invention preserves an optimum aspect ratio, i.e., a large width to height ratio which is similar to widescreened movie viewing. This permits nearby objects on either side of the center of the images to enhance the depth perception seen in the stereoscopic view.

In addition, standard cathode ray tube devices, notably, standard television receivers, already include height adjustment features which can be used to eliminate overscanning. They also include a vertical linearity control which can readily be used to adjust the picture heights of the two images so that they can be rendered substantially equal. Compared with this, side-by-side display of the stereo images is much less advantageous since there is no comparably control available for adjustment of horizontal sweep in standard cathode ray tube devices. Also, the horizontal sweep is too fast to take advantage of the motion parallax effect.

Still further, effective resolution of the stereoscopic image is doubled. For example, if an object in the upper image is painted with 100 horizontal lines, the stereoscopic image appears to be painted with 200 horizontal lines. In this manner, the resolution perceived by the viewer's two eyes has twice the resolution seen by either eye alone.

Importantly, the over and under image display can be viewed with optical means without concern for adjustment for differences in eye spacing for different viewers. In the case of side-by-side image display, such adjustment would be required.

The present invention provides a single channel system which, in the case of images produced live by a television camera, requires only an optical device at the "taking" end and an optical device at the "viewing" end. Nothing is altered in the video signal so that conventional transmission, recording, etc., is possible. In many other prior systems, two cameras, two channels, and two receivers have been required to produce stereoscopic effect. Obviously, this requires twice as much equipment which is very expensive, impractical, and incompatible with TV standards.

Still other prior three-dimensional video systems use color coding for the left and right eye view with the images comingled on the screen. Viewers are required to wear red and green spectacles to unscramble the picture. Without such spectacles the video display is impossible to view and, with the spectacles, the stereo image is seen only as black and white-devoid of any color information. The technique of the present system is compatible with existing equipment since two perfectly good images are always available which can be viewed by the unaided eye in two-dimensions with full color, motion, and sound.

It will be apparent to those skilled in the art that various additions, substitutions, modifications, and omissions can be made to the apparatus and method of the present invention without departing from the scope or spirit of the invention. Thus, it is intended that the present invention cover the additions, subsitutions, modifications, and omissions provided they come within the scope of the appended claims and their equivalence.

What I claim is:

1. Apparatus for generating a stereoscopic video split field display comprising 4 mirrors forming a pair of reflecting periscopes oriented at 90 degrees with respect to each other situated in front of a conventional video camera operating at scanning rates compatible with accepted commercial broadcast standards, wherein the upper and lower halves of said display comprise a pair of stereoscopic images suitable for viewing through optical path deviating means.

2. Apparatus for viewing the display of claim 1 wherein said optical path deviating means provide continuously variable deviation angles of the optical path connecting one of said images with only one eye of the observer.

3. Apparatus as in claim 1 where said optical path deviating means include a pair of plano-cylinder refracting elements with mating curved surfaces in sliding contact with each other.

4. Apparatus as in claim 1 wherein said periscopes are arranged so that the upper image is the left eye view and the lower image is the right eye view of the stereoscopic pair.

5. Apparatus as in claim 1 wherein the reflecting elements of said periscopes are rotateable to control the angle between the entering and emerging optical paths of each periscope.

6. Apparatus as in claim 3 where said refracting elements are composed of materials having different optical dispersion properites in order to reduce color fringling of the deviated image.

7. Apparatus as in claim 3 where said mating curved surfaces are separated by a viscous fluid whose refractive index substantially equals that of the adjacent solid elements.

8. Apparatus for viewing a split field stereoscopic display where the two fields are differentially polarized at the display and the viewing apparatus comprises a pair of conventional polarizing sunglasses supporting an attachment in front of one eye, said attachment comprising an optical path deviating means and a half wave retardation plate which rotates the plane of the incoming polarized light through an angle of 90 degrees.

* * * * *